US012760775B2

(12) United States Patent
Jedele

(10) Patent No.: US 12,760,775 B2
(45) Date of Patent: Oct. 13, 2026

(54) TELESCOPING BALL NUT ASSEMBLY

(71) Applicant: Akebono Brake Industry Co., Ltd., Tokyo (JP)

(72) Inventor: Philip Nathanael Jedele, Ypsilanti, MI (US)

(73) Assignee: Akebono Brake Industry Co., Ltd., Tokyo (JP)

( * ) Notice: Subject to any disclaimer, the term of this patent is extended or adjusted under 35 U.S.C. 154(b) by 544 days.

(21) Appl. No.: 18/129,489

(22) Filed: Mar. 31, 2023

(65) Prior Publication Data

US 2024/0328472 A1 Oct. 3, 2024

(51) Int. Cl.

| | |
|---|---|
| ***F16D 65/18*** | (2006.01) |
| *F16D 121/24* | (2012.01) |
| *F16D 125/40* | (2012.01) |
| *F16D 127/06* | (2012.01) |

(52) U.S. Cl.

CPC .......... *F16D 65/18* (2013.01); *F16D 2121/24* (2013.01); *F16D 2125/40* (2013.01); *F16D 2127/06* (2013.01)

(58) Field of Classification Search

CPC ............. F16D 2125/36; F16D 2125/40; F16H 25/2056

USPC ......................................................... 74/89.35

See application file for complete search history.

(56) References Cited

U.S. PATENT DOCUMENTS

| | | | |
|---|---|---|---|
| 5,358,265 A | 10/1994 | Yaple | |
| 5,943,910 A | 8/1999 | Babinski | |
| 6,264,011 B1 | 7/2001 | Zernickel | |
| 6,325,182 B1 | 12/2001 | Yamaguchi et al. | |
| 6,752,249 B1 | 6/2004 | Jungbecker et al. | |
| 8,327,981 B2 | 12/2012 | Giering et al. | |
| 10,428,888 B2 | 10/2019 | Al-Mahshi | |
| 2004/0173041 A1 * | 9/2004 | Said | F16H 25/2056 74/89.35 |
| 2005/0268736 A1 | 12/2005 | Gaechter | |
| 2007/0029142 A1 | 2/2007 | Drennen et al. | |
| 2012/0011951 A1 | 1/2012 | Gaecther et al. | |
| 2012/0090418 A1 * | 4/2012 | Barthlein | F16D 65/18 74/424.81 |
| 2014/0090501 A1 | 4/2014 | Kuster | |
| 2018/0058553 A1 | 3/2018 | Kick-Rodenbuecher et al. | |
| 2019/0003562 A1 * | 1/2019 | Hawksworth | F16H 25/2454 |
| 2019/0072162 A1 * | 3/2019 | Oswald | F16H 25/2015 |
| 2020/0263748 A1 * | 8/2020 | Ritter | F16D 55/226 |

(Continued)

FOREIGN PATENT DOCUMENTS

| | | |
|---|---|---|
| EP | 1 218 646 B1 | 3/2005 |
| WO | 2004/020871 A1 | 3/2004 |

*Primary Examiner* — Nicholas J Lane

(74) *Attorney, Agent, or Firm* — The Dobrusin Law Firm, P.C.

(57) ABSTRACT

A telescoping ball nut assembly comprising an inner nut, an outer nut, and a screw. The inner nut has a release stop located on or proximate to a first end thereof and an apply stop located on or proximate to a second end thereof, the first end opposing the second end. The outer nut has a release stop located on or proximate to an end thereof corresponding in orientation to the first end of the inner nut. The screw comprises an apply stop located on or proximate to an end thereof corresponding in orientation to the second end of the inner nut. Pivotal translation of the screw causes axial translation of the inner nut and/or the outer nut.

20 Claims, 9 Drawing Sheets

(56) References Cited

U.S. PATENT DOCUMENTS

| | | | | |
|---|---|---|---|---|
| 2021/0310531 | A1* | 10/2021 | Tarandek ................ | B60T 13/58 |
| 2021/0404524 | A1 | 12/2021 | Al-Mahshi et al. | |
| 2023/0220896 | A1* | 7/2023 | Koduri .................... | F16D 65/18<br>188/72.8 |

* cited by examiner

FIG. 1A
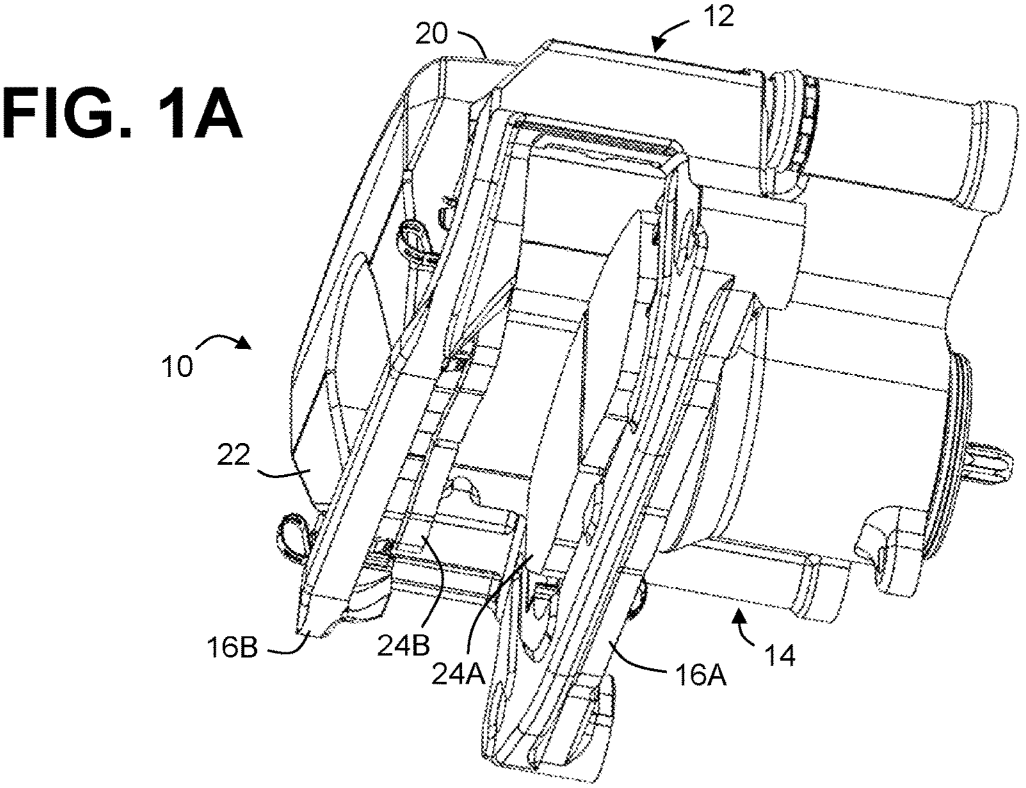
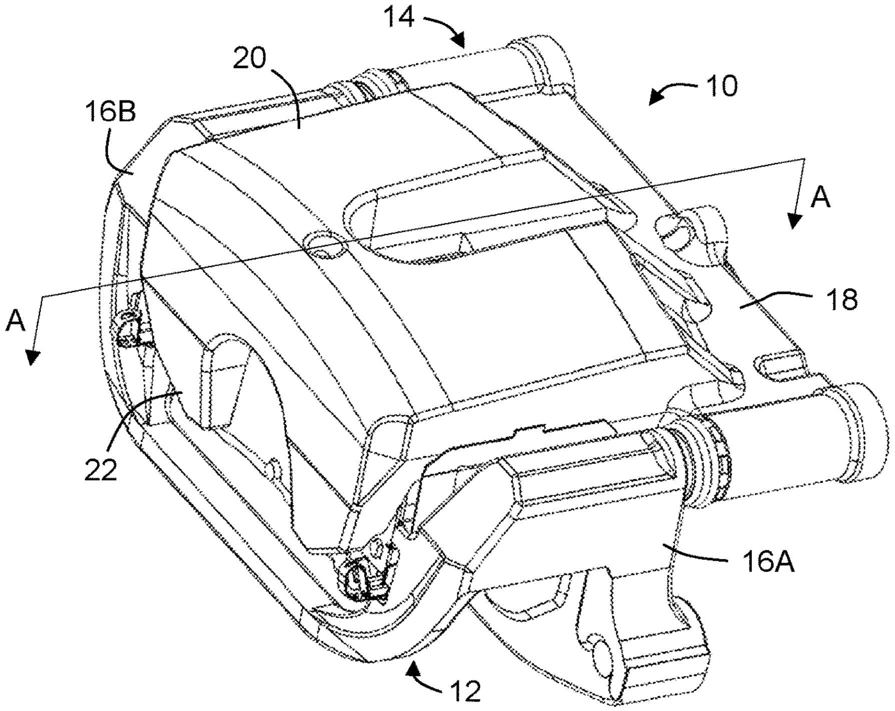
FIG. 1B

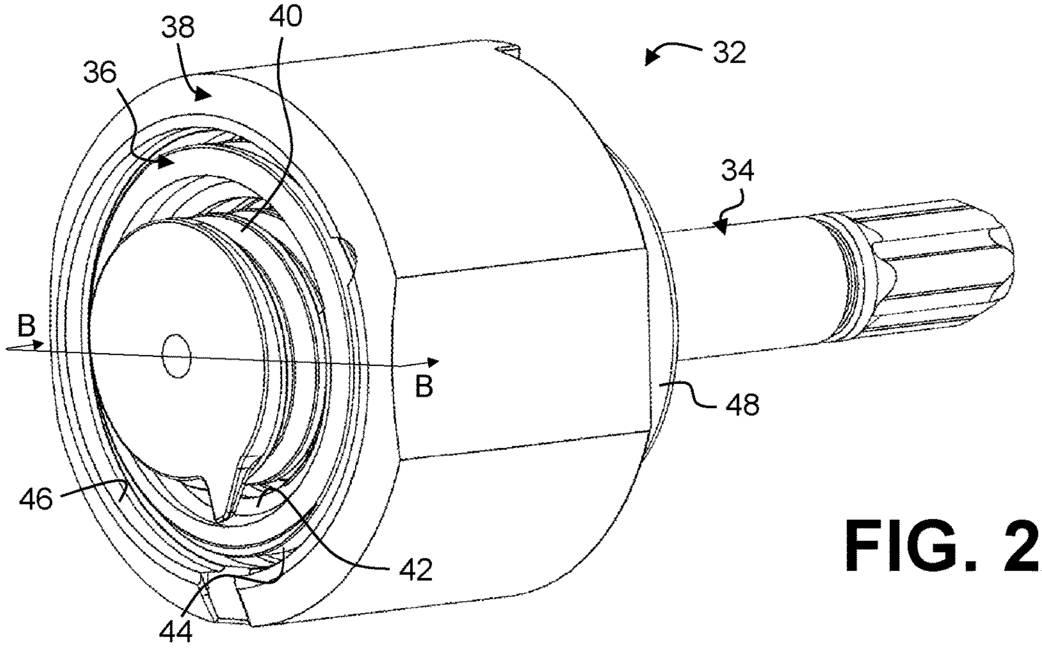
FIG. 2A
FIG. 2B
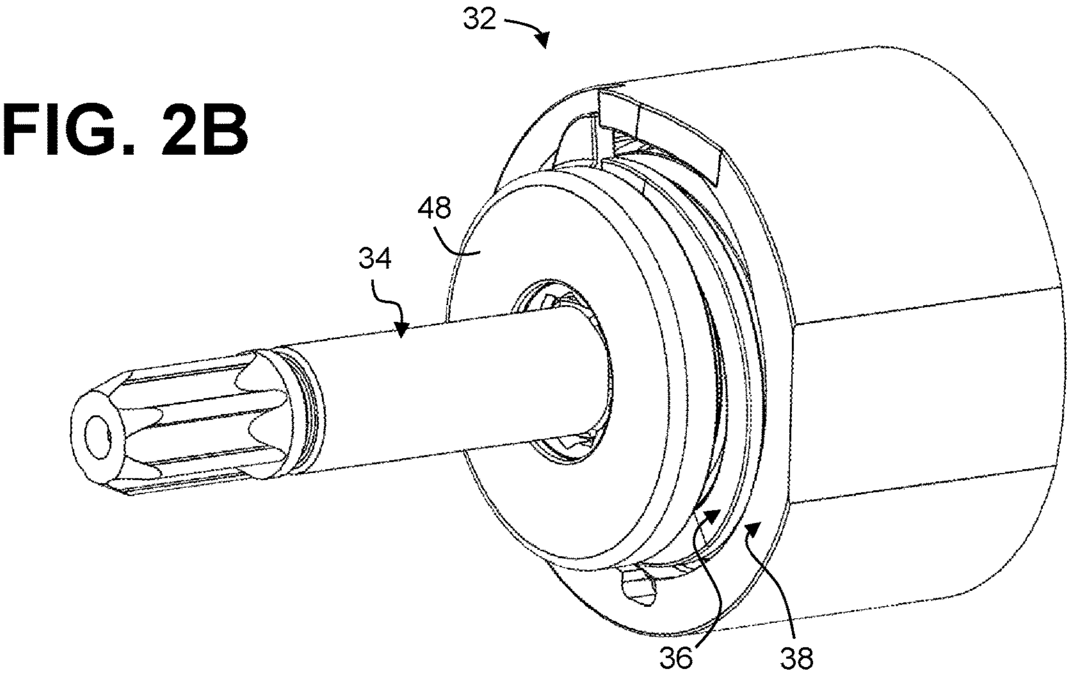

FIG. 7
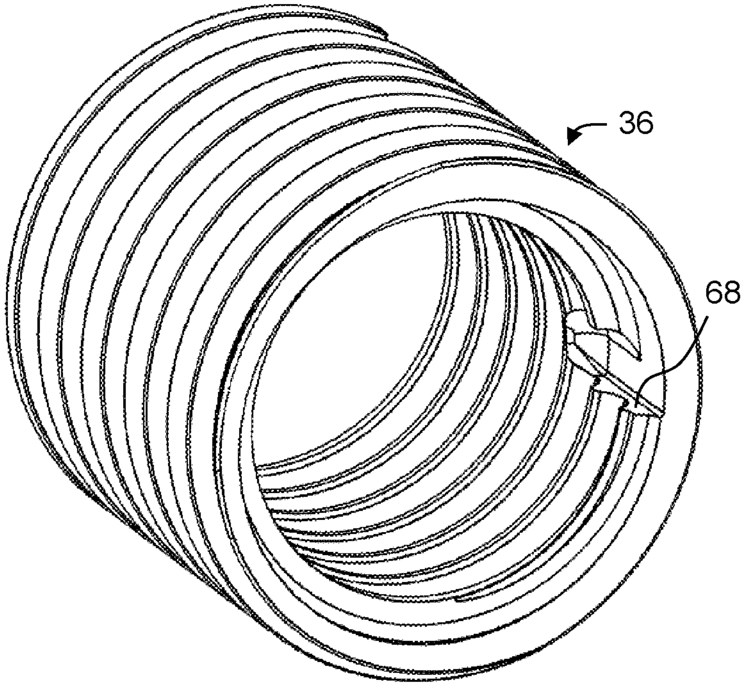
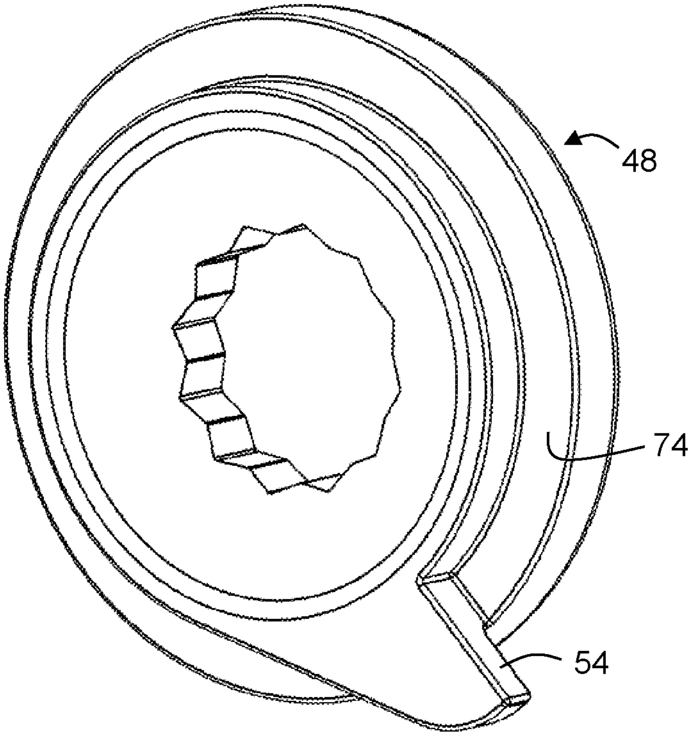
FIG. 8

TELESCOPING BALL NUT ASSEMBLY

FIELD

The present disclosure relates to a telescoping ball nut assembly, which may be employed in an electric park brake system.

BACKGROUND

Ball nut assemblies are conventionally used in electromechanical parking brake systems. In these systems, an actuator (e.g., a motor) causes a screw to pivotably translate, which in turn causes a nut to axially translate and apply a force upon a piston that acts upon a brake pad and/or a brake shoe. As a result, a wheel and/or a vehicle is caused to slow down, stop, or both.

There persists a need in the automotive industry to reduce the packaging space and/or weight of various vehicle components such as brake systems. In this regard, the overall vehicle size and weight may be reduced relative to conventional vehicles, and packaging space can be freed to accommodate for other vehicle components.

There is a need for a brake system with reduced packaging size relative to current electric park brake and electromechanical brake systems.

SUMMARY

The present teachings provide for a telescoping ball nut assembly that addresses at least some of the needs discussed above. The telescoping ball nut assembly may comprise an inner nut, an outer nut, and a screw. The inner nut may have a release stop located on or proximate to a first end thereof and an apply stop located on or proximate to a second end thereof. The first end may oppose the second end. The outer nut may have a release stop located on or proximate to an end thereof corresponding in orientation to the first end of the inner nut. The screw may comprise an apply stop located on or proximate to an end thereof corresponding in orientation to the second end of the inner nut.

Pivotal translation of the screw may cause axial translation of the inner nut and/or the outer nut. At least one benefit of the telescoping ball nut assembly according to the present teachings may be realized in a multi-stage apply operation. In each stage, one or more of the elements of the telescoping ball nut assembly may axially translate a distance.

The screw may be concentrically arranged within the inner nut. The screw and the inner nut may be concentrically arranged within the outer nut.

The screw, the inner nut, and the outer nut each may comprise tracks and the telescoping ball nut assembly may comprise balls disposed within the tracks. The tracks may helically wind around the screw, the inner nut, and the outer nut, respectively. The tracks of the inner nut may include inner tracks disposed around the inner circumference thereof and oriented toward the screw. The tracks of the inner nut may include outer tracks disposed around the outer circumference thereof and oriented toward the outer nut.

The tracks of the screw, the inner track of the inner nut, the outer track of the inner nut, and the track of the outer nut may have the same ratio of rotation to axial displacement conversion.

The tracks of the screw and the inner track of the inner nut have a ratio of rotation to axial displacement conversion that is different from the ratio of rotation to axial displacement conversion of the outer track of the inner nut and the track of the outer nut.

The apply stop of the inner nut may be formed in or on at least a portion of an inner circumference of the inner nut. The apply stop of the screw may extend radially from the screw, on or proximate to the end of the screw. A surface of the apply stop is flush with the end of the screw.

The apply stop of the inner nut and the apply stop of the screw, upon mutual interference thereof, may cause axial translation of the inner nut to cease and radial translation of the inner nut to commence.

The apply stop of the screw and the apply stop of the inner nut may each comprise a flat face. The flat face may extend along radii thereof.

In a first stage, the screw may pivotably translate while the inner nut and the outer nut may axially translate a first distance. In a second stage, the screw and the inner nut may pivotably translate while the outer nut may axially translate a second distance. In this regard, translation of the combined first and second distances, or at least a portion thereof, may cause a brake pad or a brake shoe to apply pressure to a rotor. The multi-stage apply operation taught herein may find benefit in reducing the overall length of a ball nut assembly while maintaining the functionality thereof with a telescoping action.

The release stop of the inner nut and the release stop of the outer nut may extend generally in a direction parallel to a pivot axis of the telescoping ball nut assembly.

The release stop of the inner nut and the release stop of the outer nut may extend respectively from the second end of the inner nut and the end of the outer nut.

The telescoping ball nut assembly may comprise a flange. The flange may be pivotably captive relative to the screw. The flange may comprise a release stop extending radially therefrom.

The release stop of the flange may extend, from a surface of the flange, generally in a direction parallel to the pivot axis of the telescoping ball nut assembly.

The release stops of the flange, the inner nut, and the outer nut may each comprise flat faces that extend along radii thereof. The flat face of the flange may be oriented in a direction opposing a direction in which the flat faces of the inner nut and the outer nut are oriented.

The flange may be generally washer shaped.

The flange may comprise engagement features located around an inner circumference thereof and the screw may comprise engagement features located around an outer circumference thereof. Coupling of the engagement features of the flange to the engagement features of the screw member may pivotably captivate the flange relative to the screw.

The engagement features of the flange may be in the form of teeth, which index to the engagement features of the screw. The engagement features of the screw may be in the form of teeth, which index to the engagement features of the flange.

The telescoping ball nut assembly of the present teachings may be employed in a sliding caliper brake system, an opposed piston brake system, or any combination thereof. In this regard, the telescoping ball nut assembly may be employed to apply a braking force to slow and/or stop a vehicle.

The system may comprise an actuator (e.g., a motor) and optionally one or more linkages that pivotably influence the screw.

The system may comprise a piston which the outer nut axially influences.

The system may comprise a brake pad or a brake shoe that applies pressure to a rotor by influence of the piston. In this regard, a braking force to slow and/or stop a vehicle may be effectuated.

BRIEF DESCRIPTIONS OF THE DRAWINGS

FIG. 1A is a perspective view of a brake assembly.

FIG. 1B is a perspective view of a brake assembly.

FIG. 2A is a perspective view of a telescoping ball nut assembly.

FIG. 2B is a perspective view of the telescoping ball nut assembly.

FIG. 7 is a perspective view of an inner nut.

FIG. 8 is a perspective view of a flange.

DETAILED DESCRIPTION

Figure 1C:
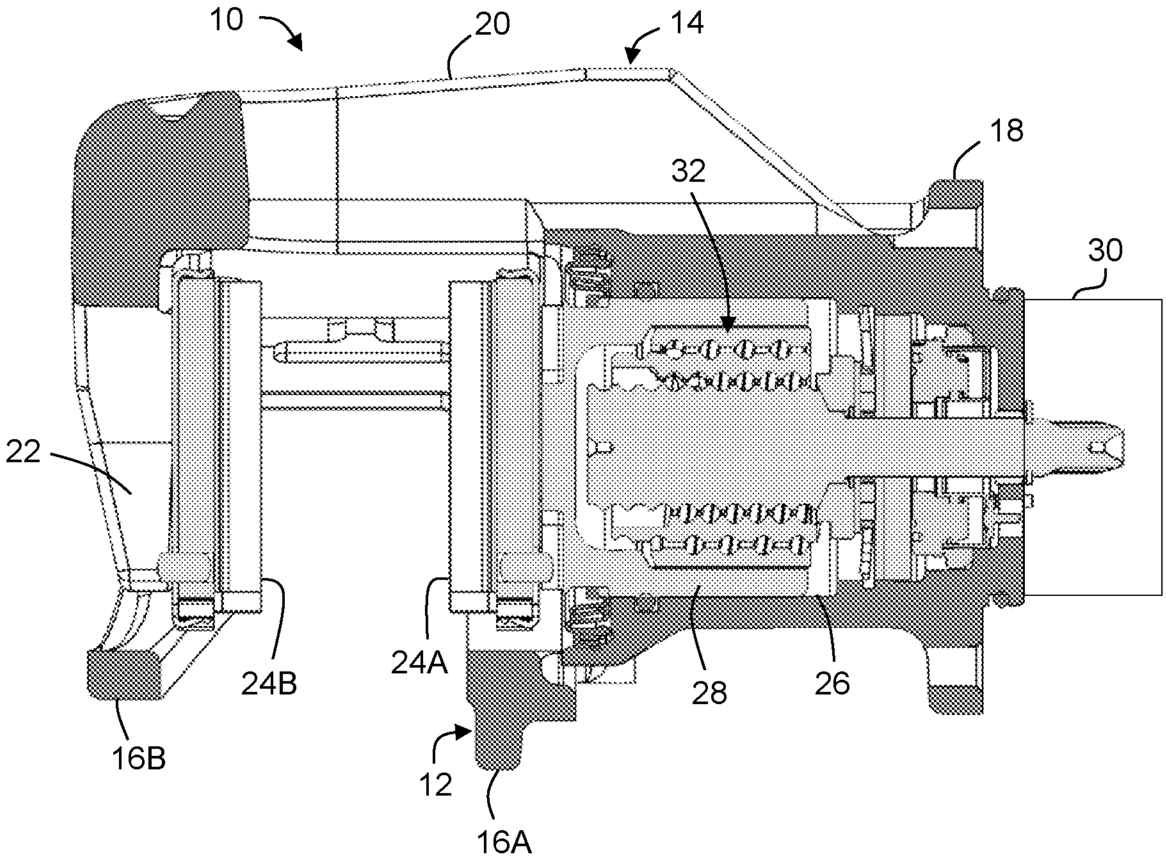
FIG. 1C is a sectional view of the brake assembly along the plane A-A shown in FIG. 1B.

The present teachings provide for a telescoping ball nut assembly. The telescoping ball nut assembly may find application in a brake system of a vehicle. The brake system may be in the form of a sliding caliper or opposing piston.

The ball nut assembly of the present teachings may have a reduced overall length relative to current designs via a telescoping design.

The brake system may comprise a caliper. The caliper may comprise an inboard portion and an outboard portion. Inboard, as referred to herein, may mean oriented toward a centerline of the vehicle. Outboard, as referred to herein, may mean oriented away from a centerline of the vehicle. The inboard and outboard portions may be unitary (e.g., cast and/or machined as a unitary component) or two components fastened together (e.g., by fasteners including bolts, screws, or the like).

The brake system may comprise one or more cylinders. The cylinders may function to each house a piston, guide movement of respective pistons, contain hydraulic pressure therewithin, receive at least a portion of the telescoping ball nut assembly of the present teachings, or any combination thereof.

One or more cylinders may be disposed in the inboard portion and/or the outboard portion of the caliper. The cylinders may include a forward cylinder and a rearward cylinder (i.e., forward and rearward relative to the respective ends of the vehicle). The cylinders may include one or more additional cylinders between the forward and rearward cylinder.

Typically, a pair of cylinders may be provided on the inboard portion of the caliper and a pair of cylinders may be provided on the outboard portion of the caliper. In this regard, even pressure may be applied to two ends of the brake pads by the pistons housed within the respective cylinders. In some configurations of sliding caliper systems, one of the inboard or outboard portions may be free of a cylinder and piston, and in their place, fingers of a sliding caliper may apply a braking force upon the brake pad.

The brake system may comprise one or more pistons. The pistons may function to engage the brake pads. The pistons may locate within the cylinders, move relative to the cylinders, or both. The pistons may be disposed in the inboard and/or outboard portions of the caliper. The pistons may have a first side oriented toward a brake pad and a second side upon which a ball nut assembly engages. The pistons may be actuated by hydraulic pressure, an electromechanical system (i.e., comprising a ball nut assembly), or both.

The brake system may comprise a support bracket and a sliding caliper body. The support bracket may be associated with pistons actuated by hydraulic pressure. The sliding caliper body may be associated with pistons actuated by an electromechanical system. In some configurations, a piston may be actuated by both hydraulic pressure and an electromechanical system in different types of braking scenarios (e.g., service braking vs. park braking). The support bracket may be captive relative to a rotor upon which one or more brake pads engage. The sliding caliper body may axially translate inboard and/or outboard relative to the support bracket.

The sliding caliper body may comprise a base, a bridge, one or more fingers, or any combination thereof. The base may be engaged to a ball nut assembly, the bridge may extend from the base and to an opposing side (i.e., inboard or outboard) relative to the base, and the fingers may depend from the bridge. Actuation of a first brake pad to apply a force upon a rotor may result in the sliding caliper axially translating away from the caliper. Such axial translation may be transferred via the bridge to the fingers, which act upon a second brake pad. In this regard, a clamping force may be effectuated upon the rotor.

The brake system may comprise one or more brake pads. The brake pads may function to frictionally influence a rotor to cause a wheel and/or a vehicle to slow and/or stop. The brake pads may be located inboard and/or outboard of the rotor.

The brake system may comprise one or more brake shoes. The brake shoes may function to frictionally influence a drum to cause a wheel and/or a vehicle to slow and/or stop. The brake shoes may be located circumferentially relative to the drum.

The brake pads and rotors may comprise a pressure plate and a friction material. The pressure plate may be engaged by one or more pistons. The friction material may engage a rotor. The friction material may include one or more non-metallic materials, semi-metallic materials, fully metallic materials, and ceramic materials.

The brake system may comprise a motor gear unit. The motor gear unit may function to actuate an electromechanical braking system. The motor gear unit may comprise a motor and optionally one or more linkages (e.g., gears, spindles, belts, cables, the like, or any combination thereof). The motor and optional one or more linkages may ultimately cause the telescoping ball nut assembly to influence a piston in an apply direction and/or a release direction.

The brake system may comprise a telescoping ball nut assembly. The telescoping ball nut assembly may function to apply a braking force, actuate a brake pad and/or a brake shoe, or both. The telescoping ball nut assembly may be packaged within the brake system. The telescoping ball nut assembly may be located mechanically downstream of the motor gear unit and mechanically upstream of the piston. That is, operation of a motor ultimately causes a brake pad and/or a brake shoe to apply a braking force, whereby the telescoping ball nut assembly contributes to transferring energy from the motor to the brake pad and/or brake shoe.

As referred to herein, braking force may mean a force imposed by one or more brake pads upon a rotor, causing a wheel and/or a vehicle to slow, stop, or both.

The telescoping ball nut assembly may be configured to fit within small packaging spaces. In this regard, two or more nuts may be located onto a screw, each of the nuts moving a separate distance axially along a pivot axis of the screw.

Typically, a single nut may be provided onto a screw with the nut and the screw having a requisite length to provide for both the required travel of a piston and to remain stably engaged to each other. The present teachings provide for a telescoping ball nut assembly that can realize a reduced overall length (as measured along the pivot axis of the screw) relative to typical single-nut designs.

The telescoping ball nut assembly may comprise a screw, an inner nut, and an outer nut. The screw may be concentrically arranged within the inner nut. The screw and the inner nut may be concentrically arranged within the outer nut. Accordingly, the pivot axis of the screw and/or inner nut and the translation axis of the inner nut and/or outer nut, are coaxial and may be referred to herein interchangeably. For clarity, reference will be repeatedly made to the pivot axis of the screw.

The screw may pivotably translate during the operation of a motor. The inner nut and the outer nut may axially translate along the pivot axis of the screw. Axial translation may be in an apply direction or a release direction. Translation in the apply direction may cause a braking force to be applied. Translation in the release direction may cause a braking force to be released.

The present teachings contemplate that one or more additional nuts may be employed in the telescoping ball nut assembly. In this regard, the overall length of piston travel in an apply operation can be increased with the addition of nuts.

The telescoping ball assembly may comprise a screw. The screw may function to transfer motion from a motor to two or more nuts, prevent axial over-travel of the two or more nuts, or both.

The screw may be connected to a motor. One or more linkages (e.g., gears, spindles, belts, cables, the like, or any combination thereof) may be disposed between the motor and the screw.

The screw may be a generally elongate member (e.g., rod-shaped) having a first end and a second end. The first end may be coupled to a motor or a linkage mechanically communicating with the motor. The first end may comprise engagement members for engagement to the motor or the linkage. The engagement members may comprise a plurality of teeth, facets defining a polygonal profile, or both. The engagement member may be indexed to the motor or the linkage.

The screw may comprise a track. The track may helically wind around the screw (e.g., around an outer circumference thereof). The track may have a curved profile. The curved profile may be in the form of a circular segment (e.g., a semi-circle). The track may be adapted to receive a plurality of balls therein. The balls may be disposed between the screw and the inner nut, within the track of the screw and an inner track of the inner nut.

The track may extend from the second end of the screw, or from a point proximate to the second end of the screw (e.g., 15 mm or less, 10 mm or less, or even 5 mm or less from the second end), to the engagement feature located at the first end of the screw, or at least a portion thereof. The screw may comprise an intermediate segment between the track and the engagement feature. The intermediate segment may be free of the track. The intermediate segment may be generally cylindrical.

The telescoping ball nut assembly may comprise an inner nut. The inner nut may function, in cooperation with an outer nut, to influence travel of a piston over a first distance. The inner nut may be generally in the form of a tube disposed over the screw and within the outer nut.

The inner nut may comprise tracks. The tracks may include an inner track, an outer track, or both. The inner track may helically wind around the inner nut (e.g., around an inner circumference of the inner nut). The outer track may helically wind around the inner nut (e.g., around an outer circumference of the inner nut). The inner track may be oriented toward the screw. The outer track may be oriented toward an outer nut.

The inner and/or outer tracks may have a curved profile. The curved profile may be in the form of a circular segment (e.g., a semi-circle). The inner and/or outer tracks may be adapted to receive a plurality of balls therein. The balls may be disposed between the inner nut and the screw, within the inner track of the inner nut and the track of the screw. The balls may be disposed between the inner nut and the outer nut, within the outer track of the inner nut and a track of the outer nut.

The inner track and/or the outer track may extend from a first end of the inner nut to a second end of the inner nut, or at least partially therebetween. The extent of the inner track may be generally the same as or different from the extent of the outer track. The inner track and/or outer track may terminate at or proximate (e.g., 15 mm or less, 10 mm or less, or even 5 mm or less) to the first and/or second ends of the inner nut.

The telescoping ball nut assembly may comprise an outer nut. The outer nut may function to influence travel of a piston over a second distance. The outer nut may be generally in the form of a tube disposed over the inner nut.

The outer nut may comprise a track. The track may helically wind around the outer nut (e.g., around an inner circumference of the outer nut). The track may be oriented toward the inner nut. The track may have a curved profile. The curved profile may be in the form of a circular segment (e.g., a semi-circle). The track may be adapted to receive a plurality of balls therein. The balls may be disposed between the outer nut and the inner nut, within the track of the outer nut and the outer track of the inner nut.

The track may extend from a first end of the outer nut to a second end of the outer nut, or at least partially therebetween. The track may terminate at or proximate (e.g., 1 cm or less, 5 mm or less, or even 1 mm or less) to the first and/or second ends of the outer nut.

The outer nut may comprise a contact face. The contact face may engage a piston. The contact face may engage a first surface of the piston opposing a second surface of the piston, whereby the second surface engages a brake pad or a brake shoe. The outer nut may comprise a chamfer from the inner circumference thereof to the contact face, the outer circumference thereof and the contact face, or both.

The balls disposed between the screw and the inner nut, and between the inner nut and the outer nut, may function to transfer motion between the screw, the inner nut, and the outer nut.

The screw may pivotably translate in an apply operation, causing the balls to proceed along the track of the screw in an apply direction and influence axial translation of the inner nut in the apply direction. The screw may pivotably translate in a release operation, causing the balls to proceed along the track of the screw in a release direction and influence axial translation of the inner nut in the release direction.

In a first stage of an apply operation, the inner nut is pivotably captive and thus the outer nut translates axially with the outer nut. In a second stage of an apply operation, discussed in greater detail below, the inner nut is axially captive and rotates mutually with the screw, while the outer nut continues axial translation.

The screw may comprise one or more apply stops. The apply stop may function to axially captivate the inner nut relative to the screw and cause mutual pivotal translation of the inner nut with the screw. The apply stop may be located on or proximate (e.g., 1 cm or less, 5 mm or less, or even 1 mm or less) to an end of the screw. The end may correspond in orientation to an end of the inner nut having an apply stop. The end may be a second end of the screw opposing the first end associated with the engagement features to which a motor or a linkage is engaged, as discussed hereinbefore.

The apply stop of the screw may extend radially from the screw. A surface of the apply stop may be flush with the second end of the screw. The apply stop may comprise a flat face extending along a radii thereof.

The inner nut may comprise one or more apply stops. The apply stop may function to axially captivate the inner nut relative to the screw and cause mutual pivotal translation of the inner nut with the screw. The apply stop may be located on or proximate (e.g., 1 cm or less, 5 mm or less, or even 1 mm or less) to an end of the inner nut. The end may be a second end of the inner nut opposing a first end associated with a release stop, discussed in greater detail below.

The apply stop of the inner nut may be formed in or on at least a portion of an inner circumference of the inner nut. The apply stop may be in the form of a notch formed radially into the inner nut (e.g., into the inner track thereof). The apply stop may exhibit material removal or an absence of material in the inner track of the inner nut. The apply stop may extend a length along the pivot axis of the inner nut, from the second end of the nut. The apply stop may extend through one, two, three, or even more of the helical windings of the inner track. The apply stop may comprise a flat face extending along a radii of the inner nut.

The inner nut may comprise a clearance extending at least partially along the inner circumference of the inner nut and extending a length along the pivot axis of the inner nut. The clearance may be characterized by an absence of the inner track. During at least a first portion of the first stage of the apply operation, the apply stop of the screw may be axially offset from the second end of the inner nut. In this regard, interference of the apply stop by the inner nut may not be of concern. During at least a second portion of the first stage of the apply operation, the apply stop of the screw may pass across the second end of the inner nut and enter the tubular profile of the inner nut. In this regard, the clearance may allow the screw to continue pivotal translation even after passing across the second end of the inner nut.

The present teachings contemplate other suitable configurations of the apply stops. By way of example but not limitation, the form of the apply stops described above may be exchanged. That is, the apply stop of the screw may be in the form of a notch formed radially into the screw (e.g., into the track thereof) and the apply stop of the inner nut may be in the form of a radial projection at or proximate to the second end of the inner nut.

By way of example but not limitation, the apply stop of the inner nut may axially extend from the second end of the inner nut in a direction parallel to the pivot axis of the screw. In this regard, the apply stop of the inner nut in the form of an axial projection may interfere with the apply stop of the screw in the form of a radial projection.

By way of example but not limitation the apply stop of the inner nut may radially extend at or proximate to the second end of the inner nut and the apply stop of the screw may axially extend from the second end of the screw in a direction parallel to the pivot axis of the screw.

In a first stage of the apply operation, the inner screw may axially translate in an apply direction while the screw pivotably translates. Eventually, the apply stop of the inner screw may interfere with the pivotal translation of the apply stop of the screw. The flat faces of the apply stops may engage each other. Upon such interference a second stage of the apply operation may commence.

In a second stage of the apply operation, the screw may continue pivotal translation and carry the inner nut in pivotal translation due to the engagement of the respective apply stops. As a result, the balls disposed between the inner nut and the outer nut may proceed along the outer track of the inner nut, influencing axial translation of the outer nut in the apply direction.

The outer nut may continue axial translation until a requisite force is realized. By way of example, as force is applied to a brake pad or a brake shoe, the associated torque applied by the motor may cause an increase in motor current, which can be provided as a signal to cease motor operation at a threshold.

In the first stage, the inner nut and the outer nut may axially translate a first distance. In the second stage, the outer nut may axially translate a second distance. The sum of the first and second distances may be commensurate with the typical distances of piston travel in conventional brake systems. However, in a release operation, the screw, inner nut, and outer nut may telescope and occupy a length along the pivot axis of the screw that is relatively less than the lengths of conventional ball nut assemblies.

The screw may comprise a flange. The flange may function to preclude over-travel of the inner nut and/or the outer nut in the release direction. The flange may be located between the track of the screw and the engagement features of the screw associated with a motor and/or a linkage. The flange may be located at or proximate (e.g., 1 cm or less, 5 mm or less, or even 1 mm or less) to the termination of the track.

The flange may extend radially from the screw. The radius of the flange may be generally equal to, greater than, or less than a radius of the outer nut. The flange may be generally washer shaped.

The flange may be pivotably captive relative to the screw. The engagement members may include engagement members of the screw and engagement members of the flange. The engagement members of the screw may be formed in or on the outer circumference thereof. The engagement members of the flange may be formed in or on an inner circumference thereof.

The engagement members of the screw may be in the form of facets defining a polygonal profile and the engagement members of the flange may be in the form of teeth, or vice versa. The engagement members of both the screw and the flange may be in the form of teeth. The engagement members of both the screw and the flange may be in the form of facets defining a polygonal profile. The engagement members of the flange may index to the engagement members of the screw.

The flange may comprise one or more release stops. The release stop may function to axially captivate the inner nut and/or the outer nut, prevent over-travel of the inner nut and/or the outer nut in the release direction, or both.

The release stop may radially project from the flange. The release stop may comprise a flat face extending along a radius of the flange. The flat face may contact the release stops of the inner nut and the outer nut in a release operation. The release stop may extend from a surface of the flange in a direction parallel to the pivot axis of the screw.

The inner nut may comprise one or more release stops. The release stop may function to axially captivate the inner nut, prevent over-travel of the inner nut in the release direction, or both.

The release stop may be formed on or proximate (e.g., 1 cm or less, 5 mm or less, or even 1 mm or less) to a first end of the inner nut, opposing the second end of the inner nut. The release stop may extend axially in a direction parallel to the pivot axis of the screw.

The release stop may comprise a flat face extending along a radius of the inner nut. The flat face may contact the release stop of the flange in a release operation. The release stop of the inner nut may be angularly positioned commensurate with the release stop of the outer nut such that both release stops interfere with the release stop of the flange at the same time, or generally the same time. The flat face of the inner nut may be oriented toward the flat face of the flange.

The outer nut may comprise one or more release stops. The release stop may function to axially captivate the outer nut, prevent over-travel of the outer nut in the release direction, or both.

The release stop may be formed on or proximate (e.g., 1 cm or less, 5 mm or less, or even 1 mm or less) to a first end of the outer nut, opposing the second end of the outer nut. The release stop may extend axially in a direction parallel to the pivot axis of the screw.

The release stop may comprise a flat face extending along a radius of the outer nut. The flat face may contact the release stop of the flange in a release operation. The release stop of the outer nut may be angularly positioned commensurate with the release stop of the inner nut such that both release stops interfere with the release stop of the flange at the same time, or generally the same time. The flat face of the inner nut may be oriented toward the flat face of the flange.

The present teachings contemplate any other suitable form of the release stops of the flange, the inner nut, and the outer nut. By way of example but not limitation, the release stops of the inner nut and the outer nut may extend radially therefrom and the release stop of the flange may extend axially in a direction parallel to the pivot axis of the screw.

In a release operation, the screw may pivotably translate causing the inner nut and the outer nut to telescope over the screw. The pivotal direction of the screw in the release operation may oppose the pivotal direction of the screw in the apply operation. By way of example, the screw may pivot clockwise in the apply operation and counterclockwise in the release operation, or vice versa.

At least some of the axial translation of the inner nut and the outer nut in the release direction may be associated with force relaxation of the brake pad or the brake shoe. That is, as force is applied in the apply operation, an equal and opposite force is imposed on the components of the telescoping ball nut assembly. Thus, when the braking force is released by the motor, force relaxation may contribute to axial translation of the inner nut and/or the outer nut in the release direction.

In a first stage of the release operation, the apply stop of the screw may disengage from the apply stop of the inner nut. Thus, the inner nut may axially translate as pivotal translation is no longer imposed on the inner nut by the screw. The inner nut may axially translate toward the flange until eventually the release stop of the inner nut interferes with the release stop of the flange. Thus, continued axial translation of the inner nut in the release direction may be precluded. At this point, a second stage of the release operation may commence.

In the second stage of the release operation, the inner nut pivotably translates mutually with the screw due to the interference of the release stop thereof with the release stop of the flange. As the screw and the inner nut pivotably translate, the outer nut axially translates toward the flange and eventually the release stop of the outer nut may interfere with the release stop of the flange. Thus, continued axial translation in the release direction may be precluded.

In a full release stage, both of the release stops of the inner nut and the outer nut may be engaged with the release stop of the flange. From the full release stage, a subsequent braking event may occur causing the first stage of the apply operation to commence again.

FIG. 1A through FIG. 1C illustrate a brake assembly 10. The brake assembly 10 comprises a support bracket 12 and a sliding caliper body 14. The support bracket 12 comprises an inboard segment 16A and an outboard segment 16B. The sliding caliper body 14 comprises a base 18, a bridge 20 extending from the base 18 and over the inboard and outboard segments 16A, 16B, and finger region 22 depending from the bridge 20. The brake assembly 10 comprises an inboard brake pad 24A and an outboard brake pad 24B. The finger region 22 engages the outboard brake pad 24B and a piston (shown in FIG. 1C) engages the inboard brake pad 24A.

The piston 28 is disposed within a cylinder 26 formed within the sliding caliper body 14. The piston 28 applies a force upon the inboard brake pad 24A. In reaction to the braking force applied by the piston 28, the sliding caliper body 14 axially translates away from the support bracket 12 and accordingly, the finger region 22 acts upon the outboard brake pad 24B.

FIG. 1A and FIG. 1B are presented by way of example but not limitation. Illustrated is a sliding caliper system in which a first brake pad is acted upon by one or more pistons and a second brake pad is acted upon by the finger region 22 extending from the bridge. The present disclosure contemplates that the telescoping ball nut assembly taught herein may be employed in an opposing piston brake system, in which a first brake pad is acted upon by one or more first pistons and a second brake pad is acted upon by one or more second pistons. Moreover, the telescoping ball nut assembly may be configured for use in a drum-in-hat brake system.

FIG. 2A and FIG. 2B illustrate a telescoping ball nut assembly 32. The telescoping ball nut assembly 32 comprises a screw 34 over which an inner nut 36 is concentrically located, and over the inner nut 36, an outer nut 38 is concentrically located.

The screw 34 comprises a track 40 and the inner nut 36 comprises an inner track 42. Balls (not shown) locate between the screw 34 and the inner nut 36, within the track 40 and the inner track 42. The inner nut 36 comprises an outer track 44 and the outer nut 38 comprises a track 46. Balls (not shown) locate between the inner nut 36 and the outer nut 38, within the outer track 44 and the track 46. The balls function to transfer pivotal motion into axial motion. Moreover, the balls contribute to frictional benefits with respect to relative motion between any two immediately concentric elements (e.g., the screw relative to the inner nut, and the inner nut relative to the outer nut).

In a first apply stage, discussed below with reference to FIG. 5A and FIG. 5B, pivotal translation of the screw 34 causes axial translation of the inner nut 36 and the outer nut 38.

In a second apply stage, discussed below with reference to FIG. 6A and FIG. 6B, pivotal translation of the screw 34 causes pivotal translation of the inner nut 36 and axial translation of the outer nut 38.

The telescoping ball nut assembly 32 comprises a flange 48, which acts in a release stage, discussed below with reference to FIG. 4A and FIG. 4B.

Figure 3:
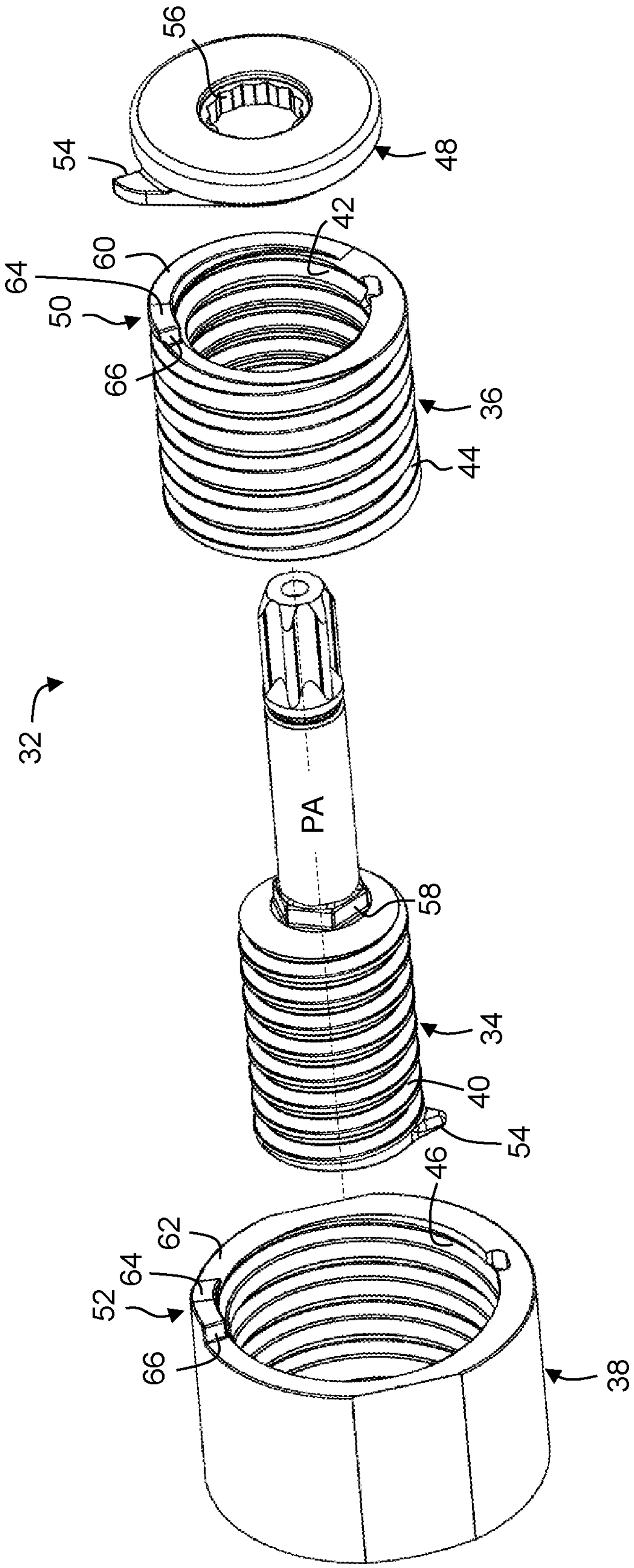
FIG. 3 is an exploded view of the telescoping ball nut assembly.

FIG. 3 illustrates the telescoping ball nut assembly 32, providing a clear view of the tracks 40, 42, 44, 46 discussed above. The tracks 40, 42, 44, 46 are in the form of helical windings and are configured to receive balls (not shown) therewithin.

The inner nut 36 and the outer nut 38 respectively comprise release stops 50, 52 that, in a release operation, interfere with a release stop 54 formed on the flange 48, discussed in greater detail below with reference to FIG. 4A and FIG. 4B. The flange 48 has engagement features 56 formed on an inner circumference thereof that locate onto engagement features 58 formed on the outer circumference of the screw 34. In this regard, the flange 48 is pivotably captivated on the screw.

As shown, the release stop 54 of the flange 48 projects radially from the flange 48 and extends a distance, in a direction parallel to the pivot axis PA of the flange 48, from a surface of the flange 48. Further, the release stops 50, 52 respectively of the inner nut 36 and the outer nut 38 extend from the ends 60, 62 thereof and comprise a ramped surface 64 and a flat face 66. The flat faces 66 of the inner nut 36 and the outer nut 38 are oriented in the same direction and come into contact with the release stop 54 of the flange 48.

The outer nut 38 comprises two opposing flat faces on the outer perimeter thereof. The opposing flat faces act as anti-rotation features by mating with corresponding opposing flat faces disposed on an inner perimeter of a piston.

The outer nut 38 has a notch on the same end as and about 180° from the release stop 52. The inner nut 36 has a notch on the same end as and about 180° from the release stop 50. The balls can be inserted within the tracks through the notches. Typically, a pin is installed relative to each of the notches to keep the balls retained within the assembly.

FIG. 3 is provided by way of example and not limitation. The present teachings contemplated any suitable configuration of the release stops 50, 52, 54, including those described herein.

The inner nut 36 comprises an apply stop 68 (shown in FIG. 5B) that interferes with an apply stop 70 of the screw 34, discussed in greater detail below with reference to FIG. 5A and FIG. 5B.

Figure 4A:
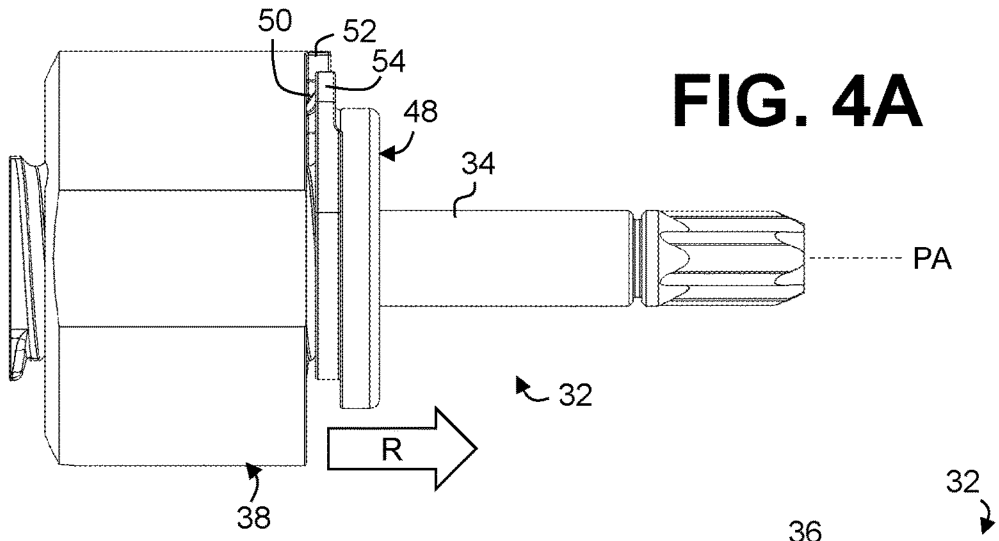
FIG. 4A is a plan view of the telescoping ball nut assembly in a full release stage.
Figure 4B:
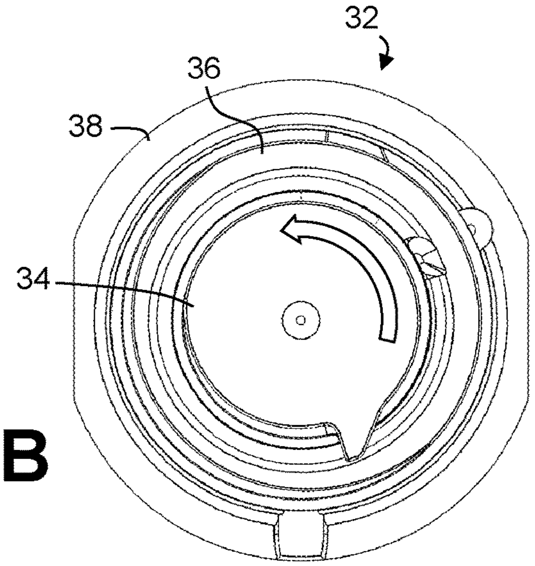
FIG. 4B is a plan view of the telescoping ball nut assembly in a full release stage.

FIG. 4A and FIG. 4B illustrate the telescoping ball nut assembly 32 in a full release stage. In a release operation, the screw 34 pivotably translates in a clockwise direction, causing axial translation of the inner nut 36 and the outer nut 38 in a release direction R. The present teachings contemplate that the telescoping ball nut assembly 32 can be configured to perform a release operation by pivotal translation of the screw 34 in a counterclockwise direction, and in this regard, the positions of the release stops 50, 52, 54 would be a mirror image (relative to a plane extending through the pivot axis PA of the screw 34) of the arrangement shown in FIG. 2B. As the inner nut 36 and the outer nut 38 axially translate toward the flange 48, the release stops 50, 52 of the inner nut 36 and the outer nut 38 eventually interfere with the release stop 54 of the flange 48. In this regard, relative motion between the screw 34, the inner nut 36, and the outer nut 38 ceases and the resting positions of these elements are predictively set and over-rotation in the release direction R can be precluded.

Figure 5A:
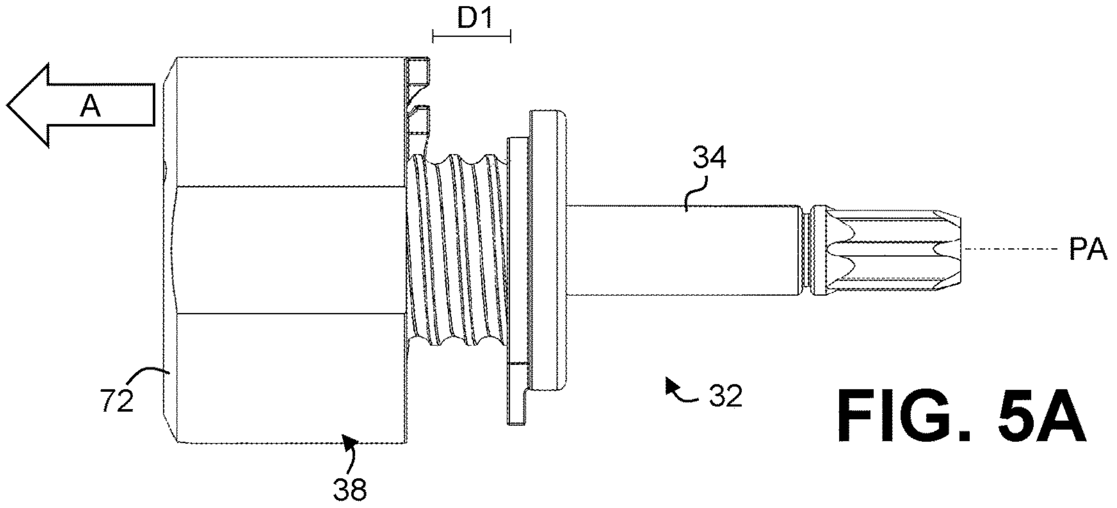
FIG. 5A is a plan view of the telescoping ball nut assembly in a first apply stage.
Figure 5B:
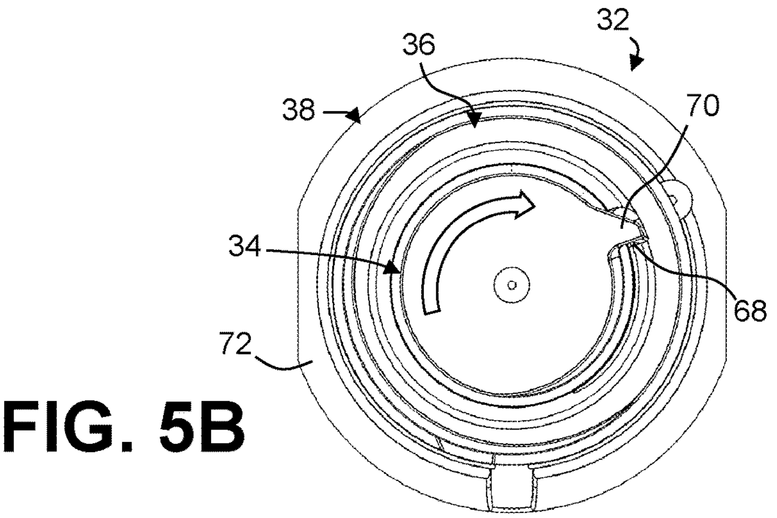
FIG. 5B is a plan view of the telescoping ball nut assembly in a first apply stage.

FIG. 5A and FIG. 5B illustrate the telescoping ball nut assembly 32 in a first apply stage. From the full release stage, the screw 34 pivotably translates in a clockwise direction in an apply operation, causing axial translation of the inner nut 36 and the outer nut 38 in an apply direction A. The present teachings contemplate that the telescoping ball nut assembly 32 can be configured to perform an apply operation by pivotal translation of the screw 34 in a counterclockwise direction. As the inner nut 36 axially translates in the apply direction A, the apply stop 70 of the screw 34 approaches the inner nut 36. Eventually, the apply stop 68 of the inner nut 36 interferes with the apply stop 70 of the screw 34. In this regard, further axial translation of the inner nut 36 is precluded and the inner nut 36 will transition from axial translation to pivotal translation commensurate with the pivotal translation of the screw 34, while the outer nut 38 continues to axially translate in the apply operation A, discussed below.

The outer nut 38 comprises a contact face 72. In the apply operation A, the outer nut 38 contacts a piston (as shown in FIG. 1A and FIG. 1B) and influences axial translation of the piston within the cylinder it resides. The contact may occur in the first apply stage and/or the second apply stage, discussed below.

In the first apply stage, the inner nut 36 and the outer nut 38 move a distance D1 (e.g., about 15 mm or less, 13 mm or less, 11 mm or less, 9 mm or less, 7 mm or less, or even 5 mm or less: preferably about 7 mm).

The release stop 50 of the inner nut 36 may be angularly offset from the apply stop 68 of the inner nut 36. In this regard, during the first apply stage, the inner nut 36 (as well as the outer nut 38) is caused to axially translate as the screw 34 pivotably translates. The angular offset may be about 20° or more, 40° or more, 60° or more, or even 80° or more. The angular offset may be about 180° or less, 160° or less, 140° or less, 120° or less, or even 100° or less. The angular offset may be selected based on the desired distance D1 the inner nut 36 is to be moved in the first stage.

Figure 6A:
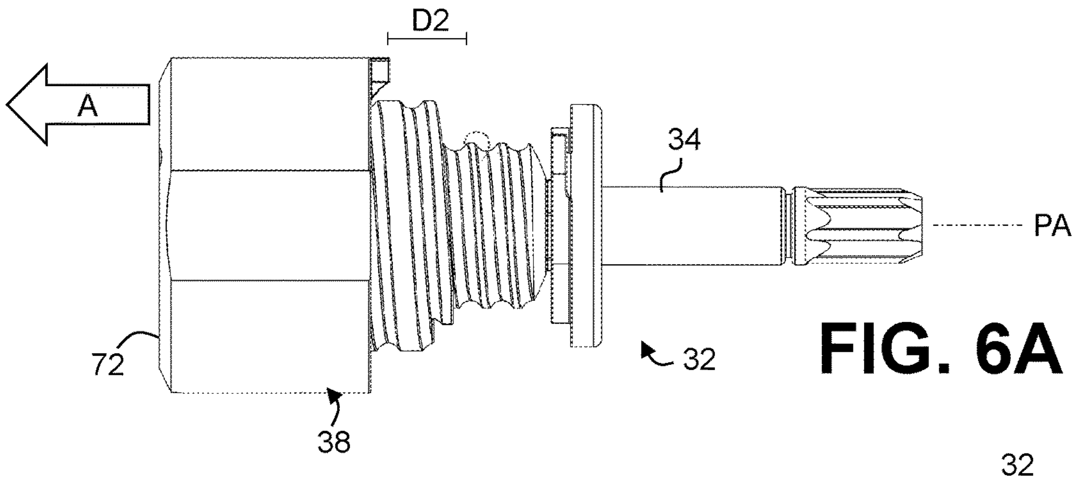
FIG. 6A is a plan view of the telescoping ball nut assembly in a second apply stage.
Figure 6B:
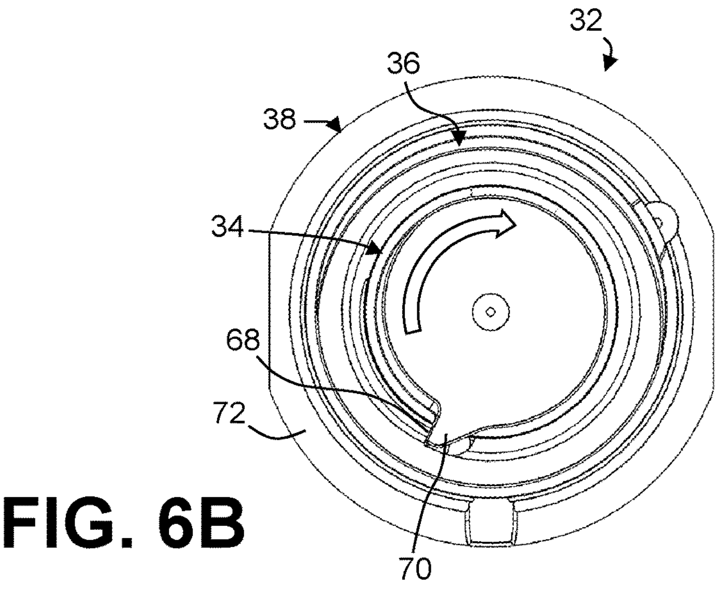
FIG. 6B is a plan view of the telescoping ball nut assembly in a second apply stage.

FIG. 6A and FIG. 6B illustrate the telescoping ball nut assembly 32 in a second apply stage. After interference of the apply stop 68 of the inner nut 36 with the apply stop 70 of the screw 34, the outer nut 38 continues to axially translate in the apply direction A. The outer nut 38 will continue to axially translate until the requisite force upon the piston, and ultimately a brake pad or brake shoe, is realized.

In the second apply stage, the outer nut 38 moves a distance D2 (e.g., 15 mm or less, 13 mm or less, 11 mm or less, 9 mm or less, 7 mm or less, or even 5 mm or less; preferably about 7 mm). The distance D1 of the first apply stage may be generally equal to, greater than, or less than the distance D2 of the second apply stage.

From the second apply stage, braking may be released, and the telescoping ball nut assembly 32 may return to the full release stage or any configuration between the second apply stage and the full release stage. The present teachings contemplate that the telescoping ball nut assembly 32 may come to rest in a configuration that is not the full release stage. That is, when braking is released, the release stops 50, 52, 54 of the screw 34, the inner nut 36, and the outer nut 38 may or may not come into contact.

FIG. 7 provides a different view of the inner nut 36 discussed above, whereby the apply stop 68 of the inner nut 36 is shown. The apply stop 68 is in the form of a notch extending radially into the inner nut 36. The apply stop 68 exhibits material removal or an absence of material in the inner track 42 helically winding around the inner nut 36. Moreover, there is a clearance in the inner circumference of the inner nut 36 to allow the apply stop 70 of the screw 34 to pivotably translate within the inner nut 36 prior to contacting the apply stop 68 of the inner nut 36.

FIG. 8 provides a different view of the flange 48 discussed above, whereby the release stop 54 thereof is shown. The release stop 54 extends from a surface 74 of the flange 48 in a direction generally parallel to the pivot axis PA of the screw 34 (shown in FIG. 3). The extended portion may be adapted to abut a roller bearing.

Figure 9:
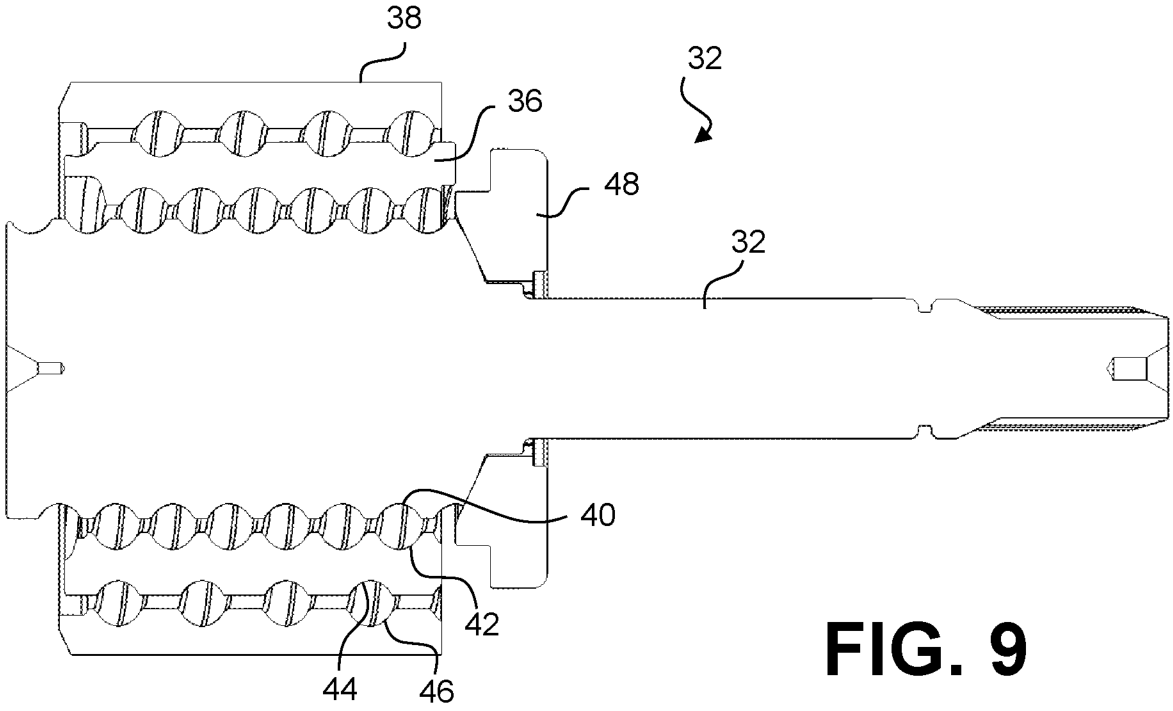
FIG. 9 is a sectional view of the telescoping ball nut assembly along the plane B-B shown in FIG. 2A.

FIG. 9 provides a sectional view of the telescoping ball nut assembly 32 in the full release stage. The screw 34 is concentrically disposed within the inner nut 36, and both the screw 34 and the inner nut 36 are concentrically disposed within the outer nut 38. The tracks 40, 42, 44, 46 all have a semi-circular profile. The drawings discussed above are presented by way of example, not limitation. The present teachings contemplate that the angular locations of the apply stops and/or the release stops, when considered relative to each other, may vary from the locations depicted to the effect that the distances D1, D2 may vary in corresponding fashion. In this regard, a greater or lesser pivotal translation may be required for the apply stops and/or the release stops to meet and accordingly a greater or lesser axial translation may result. The teachings herein may be applied by skilled artisans to adapt the telescoping ball nut assembly of the present disclosure to various different brake systems having different dimensional constraints.

Figure 10:
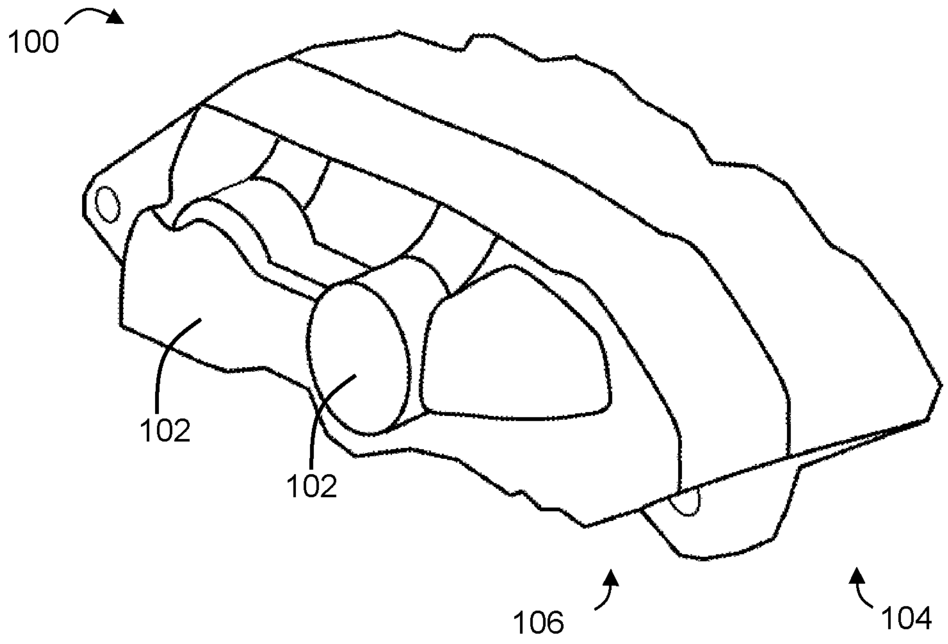
FIG. 10 is a perspective view of an exemplary opposed piston brake system.

FIG. 10 illustrates an exemplary opposed piston brake system 100 with cylinders 102 on both an inboard side 104 and an outboard side 106 thereof, the cylinders 102 containing pistons (not shown) as described herein. Each of the pistons are acted upon by a telescoping ball nut assembly (not shown), such as described above.

Moreover, the end of the screw having the apply stop may extend any distance from the end of the inner nut having the apply stop, in the full release stage, such that the distance D1 can be greater or lesser than that depicted. Likewise, the apply stop of the inner nut may extend a greater or lesser distance from the end of the inner screw. The teachings herein may be applied by skilled artisans to adapt the telescoping ball nut assembly of the present disclosure to various different brake systems having different dimensional constraints.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use. Other combinations are also possible as will be gleaned from the following claims, which are also hereby incorporated by reference into this written description.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The disclosures of all articles and references, including patent applications and publications, are incorporated by reference for all purposes.

Plural elements or steps can be provided by a single integrated element or step. Alternatively, a single element or step might be divided into separate plural elements or steps.

The disclosure of “a” or “one” to describe an element or step is not intended to foreclose additional elements or steps.

While the terms first, second, third, etc., may be used herein to describe various elements, components, regions, layers, and/or sections, these elements, components, regions, layers, and/or sections should not be limited by these terms. These terms may be used to distinguish one element, component, region, layer, and/or section from another element, component, region, layer, and/or section. Terms such as “first,” “second,” and other numerical terms when used herein do not imply a sequence or order unless clearly indicated by the context. Thus, a first element, component, region, layer, and/or section discussed below could be termed a second element, component, region, layer, and/or section without departing from the teachings.

The use of “about” or “approximately” in connection with a range applies to both ends of the range. Thus, “about 20 to 30” is intended to cover “about 20 to about 30”, inclusive of at least the specified endpoints.

Unless otherwise stated, any numerical values recited herein include both endpoints and all values from the lower value to the upper value in increments of one unit provided that there is a separation of at least 2 units between any lower value and any higher value. As an example, if it is stated that the amount of a component, a property, or a value of a process variable such as, for example, temperature, time, and the like is, for example, from 1 to 90, from 20 to 80, or from 30 to 70, it is intended that intermediate range values such as (e.g., 15 to 85, 22 to 68, 43 to 51, 30 to 32, etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner.

The term “consisting essentially of” to describe a combination shall include the elements, components, or steps identified, and such other elements, components, or steps that do not materially affect the basic and novel characteristics of the combination. The use of the terms “comprising” or “including” to describe combinations of elements, components, or steps herein also contemplates embodiments that consist essentially of the elements, components, or steps.

REFERENCE NUMERALS

10 Brake assembly
12 Support bracket
14 Sliding caliper body
16A Inboard segment of the support bracket
16B Outboard portion of the support bracket
18 Base of the sliding caliper body
20 Bridge of the sliding caliper body
22 Finger of the sliding caliper body
24A Inboard brake pad
24B Outboard brake pad
26 Cylinder
28 Piston
30 Motor gear unit
32 Telescoping ball nut assembly
34 Screw
36 Inner nut
38 Outer nut
40 Track of the screw
42 Inner track of the inner nut
44 Outer track of the inner nut
46 Track of the outer nut
48 Flange
50 Release stop of the inner nut
52 Release stop of the outer nut
54 Release stop of the flange
56 Engagement features of the flange
58 Engagement features of the screw
60 End of the inner nut
62 End of the outer nut
64 Ramped surface
66 Flat face
68 Apply stop of the inner nut
70 Apply stop of the screw
72 Contact face of the outer nut
74 Surface of the flange
100 Opposed piston brake system
102 Cylinder
104 Inboard side
106 Outboard side
PA Pivot axis
R Release direction
A Apply direction
D1 Distance
D2 Distance

What is claimed is:

1. A brake system comprising a telescoping ball nut assembly comprising:

an inner nut having tracks and a release stop located on or proximate to a first end thereof and an apply stop located on or proximate to a second end thereof, wherein the first end opposes the second end;

an outer nut having tracks and a release stop located on or proximate to an end thereof corresponding in orientation to the first end of the inner nut; and a screw comprising tracks and an apply stop located on or proximate to an end thereof corresponding in orientation to the second end of the inner nut;

wherein pivotal translation of the screw causes axial translation of the inner nut and/or the outer nut;

wherein the tracks of the inner nut include inner tracks disposed around an inner circumference thereof and oriented toward the screw, and outer tracks disposed around an outer circumference thereof and oriented toward the outer nut; and wherein the release stop of the inner nut is located on or proximate to a first end of the inner tracks thereof and the apply stop of the inner nut is located on or proximate to a second end of the inner tracks thereof.

2. The brake system according to claim 1, wherein the screw is concentrically arranged within the inner nut, and the screw and the inner nut are concentrically arranged within the outer nut.

3. The brake system according to claim 2, wherein the telescoping ball nut assembly comprises balls disposed within the tracks of the screw, the inner nut, and the outer nut; and wherein the tracks helically wind around the screw, the inner nut, and the outer nut, respectively.

4. The brake system according to claim 3, wherein the tracks of the screw, the inner track of the inner nut, the outer track of the inner nut, and the track of the outer nut have the same ratio of rotation to axial displacement conversion.

5. The brake system according to claim 3, wherein the tracks of the screw and the inner track of the inner nut have a ratio of rotation to axial displacement conversion that is different from the ratio of rotation to axial displacement conversion of the outer track of the inner nut and the track of the outer nut.

6. The brake system according to claim 3, wherein the tracks of the screw, the inner nut, and the outer nut have a curved profile;

optionally wherein the tracks of the screw, the inner nut, and the outer nut have a circular segment profile.

7. The brake system according to claim 6, wherein the apply stop of the inner nut is formed in or on at least a portion of an inner circumference of the inner nut; wherein the apply stop of the inner nut is juxtaposed with the inner tracks of the inner nut; and wherein the apply stop of the screw extends radially from the screw, on or proximate to the end of the screw.

8. The brake system according to claim 7, wherein a surface of the apply stop of the screw is flush with the end of the screw.

9. The brake system according to claim 8, wherein the apply stop of the inner nut and the apply stop of the screw, upon mutual interference thereof, causes axial translation of the inner nut to cease and radial translation of the inner nut to commence.

10. The brake system according to claim 9, wherein the apply stop of the screw and the apply stop of the inner nut each comprise a flat face that extend along radii thereof.

11. The brake system according to claim 10, wherein in a first stage, the screw pivotably translates while the inner nut and the outer nut axially translate a first distance; and in a second stage, the screw and the inner nut pivotably translate while the outer nut axially translates a second distance.

12. The brake system according to claim 11, wherein the release stop of the inner nut and the release stop of the outer nut extend, respectively from the second end of the inner nut and the end of the outer nut, generally in a direction parallel to a pivot axis of the telescoping ball nut assembly.

13. The brake system according to claim 12, wherein the telescoping ball nut assembly comprises a flange that is pivotably captive relative to the screw; and wherein the flange comprises a release stop extending radially therefrom.

14. The brake system according to claim 13, wherein the release stop of the flange extends, from a surface of the flange, generally in a direction parallel to the pivot axis of the telescoping ball nut assembly.

15. The brake system according to claim 14, wherein the release stops of the flange, the inner nut, and the outer nut each comprise flat faces that extend along radii thereof; and wherein the flat face of the flange is oriented in a direction opposing a direction in which the flat faces of the inner nut and the outer nut are oriented.

16. The brake system according to claim 15, wherein the flange comprises engagement features located around an inner circumference thereof and the screw comprises engagement features located around an outer circumference thereof; wherein coupling of the engagement features of the flange to the engagement features of the screw member pivotably captivates the flange relative to the screw; and wherein the engagement features of the flange are in the form of teeth, which index to the engagement features of the screw, or the engagement features of the screw are in the form of teeth, which index to the engagement features of the flange.

17. The brake system according to claim 1, wherein the brake system is a sliding caliper brake system; and wherein the sliding caliper brake system further comprises: an actuator that pivotably influences the screw, a piston which the outer nut axially influences, and a brake pad that applies pressure to a rotor by influence of the piston.

18. The brake system according to claim 1, wherein the brake system is an opposed piston brake system; and wherein the opposed piston brake system further comprises: an actuator that pivotably influences the screw, a piston which the outer nut axially influences, and a brake pad that applies pressure to a rotor by influence of the piston.

19. The brake system according to claim 3, wherein the inner tracks of the inner nut extend along a length of the inner nut, the length being generally commensurate with a length of the inner nut along which the outer tracks of the inner nut extend.

20. The brake system according to claim 15, wherein the release stops of the inner nut and the outer nut are both adapted to engage the release stop of the flange.

* * * * *